(12) United States Patent
Creighton

(10) Patent No.: US 6,529,560 B1
(45) Date of Patent: Mar. 4, 2003

(54) SYSTEM AND METHOD TO REDUCE THE PEAK-TO-AVERAGE POWER RATIO IN A DS-CMDA TRANSMITTER

(75) Inventor: Richard Samuel Creighton, Bath (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/261,348

(22) Filed: Mar. 3, 1999

(30) Foreign Application Priority Data

Mar. 5, 1998 (EP) ............................. 98301648

(51) Int. Cl.[7] .................... H04K 1/02; H04L 25/03; H04L 25/49
(52) U.S. Cl. .................. 375/284; 375/284; 375/298; 455/63
(58) Field of Search ................... 375/284, 295, 375/298, 235, 261, 297, 296; 455/63, 114

(56) References Cited

U.S. PATENT DOCUMENTS

| | | | |
|---|---|---|---|
| 5,621,762 A | * 4/1997 | Miller et al. ................ | 375/298 |
| 5,668,806 A | 9/1997 | Arai ............................ | 370/342 |
| 5,742,595 A | 4/1998 | Bhagalia ..................... | 370/342 |
| 5,838,733 A | * 11/1998 | Bruckert ...................... | 375/297 |
| 6,144,694 A | * 11/2000 | Uta et al. .................... | 375/297 |
| 6,266,320 B1 | * 7/2001 | Hedberg et al. ............ | 370/206 |

FOREIGN PATENT DOCUMENTS

| EP | 96110408 | 6/1996 | ........... H04B/1/707 |
|---|---|---|---|

* cited by examiner

*Primary Examiner*—Phuong Phu

(57) ABSTRACT

A peak to average power ratio in a DS-CDMA transmitter is reduced by applying hard limiting to the signal while it is in digital form and prior to any frequency band filtering. In the case of a complex signal the clipping is done by making an approximation to the magnitude of the complex signal, comparing this to a threshold value and, whenever the magnitude exceeds the threshold, scaling the in-phase and quadrature components by a factor equal to the ratio of the threshold value to the magnitude. The approximation to the magnitude is made by reducing the signal to the first octant of the complex plane, evaluating a plurality of linear functions of the reduced in-phase and quadrature components, and selecting the maximum value.

12 Claims, 3 Drawing Sheets

SYSTEM AND METHOD TO REDUCE THE PEAK-TO-AVERAGE POWER RATIO IN A DS-CMDA TRANSMITTER

CROSS-REFERENCE TO RELATED APPLICATION

This application claims priority of European Patent Application No. 98301648.6, which was filed on Mar. 5, 1998.

FIELD OF THE INVENTION

The present invention relates generally to a system and method for reducing the peak-to-average power ratio in multiple access communication systems, and more particularly to direct sequence code division multiple access (DS-CDMA) systems.

BACKGROUND OF THE INVENTION

Direct sequence code division multiple access (DS-CDMA), a form of spread spectrum communication, provides multiple users access to a common communication channel, such as a radio band or optical fibre. A DS-CDMA transmitter combines a user data stream with a digital sequence, known as a spreading code, yielding a combination bit stream, sometimes referred to as a spread signal. A spreading code generator in the DS-CDMA transmitter generates the spreading code elements, or chips, at a rate that is typically faster than the user data stream. The spreading codes are designed to appear random, although the spreading codes are duplicated at a DS-CDMA receiver for use in recovery of a user data stream.

The spread signals are summed and filtered before transmission. The summing converts the multiple parallel combination bit streams to a serial signal, and filtering limits the frequency band occupied by the signal. Additional modulation techniques, such as Binary Phase Shift Keying (BPSK) or Quadrature Phase Shift Keying (QPSK), are used to modulate a carrier signal. If a transmitter uses BPSK, the summing operation provides a digital value representing the amplitude of the summed signal for each element of the spreading code. In QPSK, however, the summing operation yields a complex digital value having an in-phase and a quadrature component.

At the DS-CDMA receiver, a spreading code generator duplicates a user's spreading code for mixing with the received signal and recovery of the particular user data stream. Since each user has a unique spreading code, signals spread with other user codes, or signals not spread at all, resemble noise and are not recovered by the receiver. The use of different spreading code sequences by each user allows users to operate independently of each other, although all data streams are transmitted in the same band.

A problem with DS-CDMA signals is connected with peaks at the output of the summation. The CDMA modulation makes the data streams look like independent random signals, so the mean square sum is proportional to N, where N is the number of data streams. Thus, the average power is proportional to N. However, there is a finite probability that in a given chip period all of the CDMA modulated data streams will have their maximum value simultaneously. Thus the peak amplitude will be proportional N and the peak power to $N^2$. The peak to average power (PAP) ratio thus increases with the number of data streams.

It is a concern in DS-CDMA systems, therefore, to experience signals with high peak to average power (PAP) ratios. A high PAP ratio reduces the efficiency of a transmitter power amplifier. If the power amplifier is allowed to saturate during periods of peak power, the distortion will cause harmonics of the input signal to appear outside the desired frequency band. The power level of the unwanted harmonics will vary with the performance of the individual power amplifier units. Out of band harmonics interfere with communication on adjacent channels.

Also, successful recovery of transmitted data in a DS-CDMA receiver relies upon the linearity of previous stages in the CDMA process. Maintaining linearity in a transmitter's power amplifier becomes progressively difficult as the number of users increases, due to the random nature of the signal generated by the summation of multiple spread signals. Due to the high PAP ratio, the power amplifier must generate sufficient mean power to maintain the signal level at the receiver but also remain linear during peak periods. Design and manufacture of such power amplifiers is costly and complex.

There is a certain tradeoff between distortion and power efficiency in a DS-CDMA transmitter. As the number of users increases, the PAP ratio also increases. The amount of tolerable distortion depends on spectral regulation and system requirements. Efficiency can be improved by allowing for more distortion, but with a corresponding degradation in the transmitted signal. Power amplifiers designed to accommodate high peaks decrease distortion, but such amplifiers are costly to design and manufacture. It is therefore, a concern to reduce PAP ratio in a deterministic manner in order to achieve an optimal tradeoff.

For these reasons, it is highly desirable to reduce the PAP for simple and complex signals in a Ds-CDMA transmitter without giving rise to excessive errors or spurious signal components.

Toshifumi, U.S. Pat. No. 5,751,705 discloses a CDMA base station transmitter that limits an amplitude of a multiplexed spread signal to not exceed a predetermined value. The limiting is done by converting a complex signal in in-phase/quadrature form into polar (phase/amplitude) form, limiting the amplitude, and converting the resulting signal back to in-phase/quadrature form. FIG. 1 shows one example of a transmitter where the amplitude is limited. The CDMA modulator 22 provides the signal to a comparator 26. The comparator 26 compares the signal to a predetermined value. If the signal exceeds the predetermined value the amplitude of the signal is limited in a limiter 28. Digital filter 30 band limits the signal.

SUMMARY OF THE INVENTION

The present invention provides a system and method to reduce peak to average power (PAP) ratio in spread spectrum transmitters by hard limiting the output of the CDMA modulator whilst it is still in the form of a digital signal and prior to any frequency band filtering. Digital values representing components of a complex signal are detected. The magnitude of the vector sum of the components of the complex signal is approximated and compared to a predetermined threshold magnitude. Where the approximated magnitude exceeds the threshold magnitude, each component of the vector sum is reduced by a scaling factor so that the magnitude of the complex signal approximately equals the threshold magnitude. Applying a stage of digital filtering substantially reduces out of band harmonics.

The present invention also teaches apparatus to reduce PAP ratio in multiple access transmitters. A detector receives at least one digital value for each element of a spreading code. A magnitude detector determines the approximate magnitude of the complex digital value. A comparator determines whether the detected magnitude exceeds a predetermined threshold. A limiter applied in the digital domain reduces the magnitude of the detected digital value to a predetermined value. Out of band harmonics are substantially reduced by a digital filter applied to the clipped signal.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION

Figure 1:
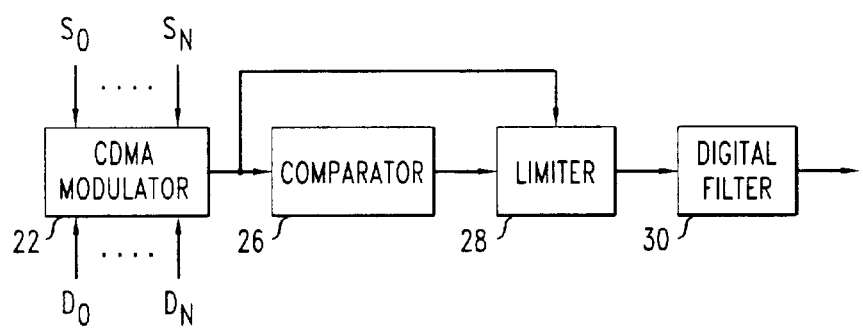
FIG. 1 is a transmitter where the amplitude of a signal is limited.
Figure 2:
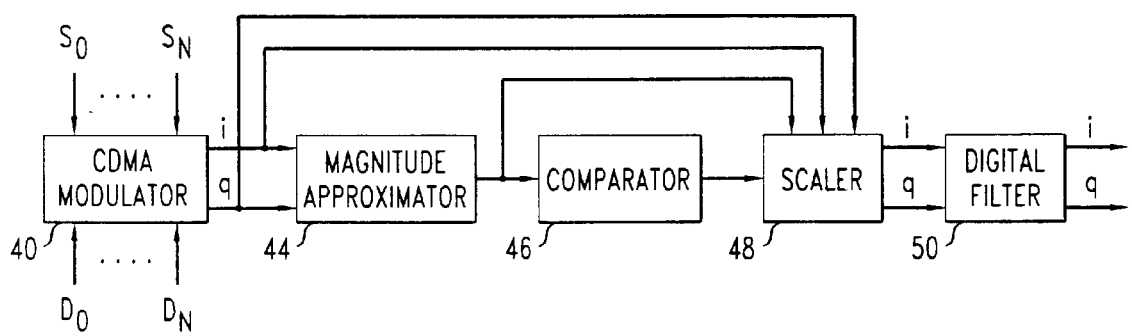
FIG. 2 is an exemplary embodiment of a transmitter according to the present invention.
Figure 3:
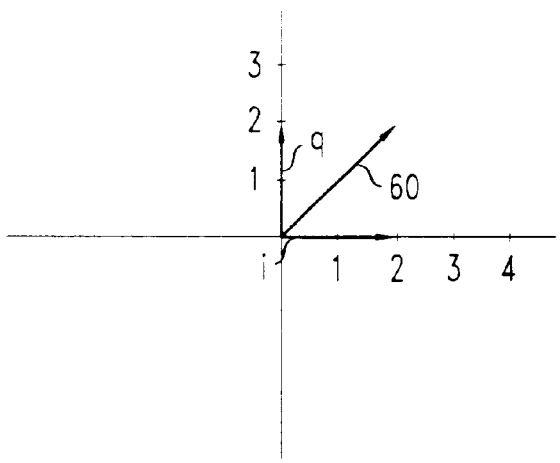
FIG. 3 shows an exemplary complex signal mapped to a co-ordinate plane.

In FIG. 2, an embodiment of the invention is shown. In this embodiment of the invention, a DS-CDMA modulator 40 provides an in-phase component and a quadrature component in the digital domain for use in Quaternary Phase Shift Keying of the carrier at QPSK modulator. For simplicity, in-phase and quadrature are referred to as i and q, respectively. Referring to FIG. 3, an example of an output i and q for the DS-CDMA modulator 40 of FIG. 2 is shown mapped to the In-phase and Quadrature co-ordinate plane 58. The magnitude of the exemplary complex digital signal is the magnitude of the vector sum 60 of i and q.

A complex magnitude approximator 44 reflects i and q to the first octant of the complex plane. An approximation of the vector magnitude is then calculated by the magnitude approximator 44. A comparator 46 receives the magnitude approximation and compares the approximation to a predetermined threshold. If the approximation exceeds the threshold, then i and q are scaled at scaler 48 to provide a signal with a magnitude substantially equal to the threshold but with the same phase. If the approximate magnitude does not exceed the threshold value the scaler 48 passes the signal unchanged. Digital filter 50 band limits the complex signal in the digital domain to substantially reduce out of band harmonics.

Figure 4:
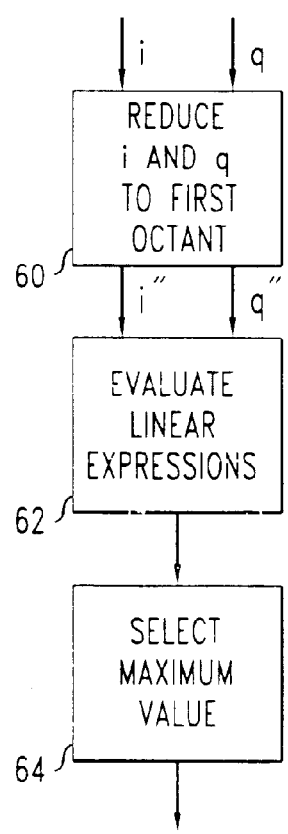
FIG. 4 is a flow diagram of a magnitude approximation method in accordance with the principles of this invention.

A block diagram showing operation of one embodiment of a magnitude approximator 44 is shown in FIG. 4. An input of a plurality of bits is detected for i and q. As shown, an initial processing step 60 reflects i and q to the first octant of the i and q co-ordinate plane. Values for i and q, after reflecting to the first octant, are referred to as i" and q" for simplicity. Thus i" is the greater and q" the lesser of |i| and |q|. The magnitude of the complex value is estimated by a step 62 of evaluating a plurality of linear functions and determining the maximum value. The maximum value is provided to the comparator 46 as the approximate magnitude of the complex digital value. The linear functions employed in step 62 in the present example are $$z(n) = c(n, 0)i'' + c(n, 1)q''$$

where n runs from 0 to 7 and the coefficients are given by

| | |
|---|---|
| c(0, 0) = 0.99922162 | c(0, 1) = 0.04908861 |
| c(1, 0) = 0.98959857 | c(1, 1) = 0.14679308 |
| c(2, 0) = 0.97044514 | c(2, 1) = 0.24308385 |
| c(3, 0) = 0.94194580 | c(3, 1) = 0.33703360 |
| c(4, 0) = 0.90437500 | c(4, 1) = 0.42773752 |
| c(5, 0) = 0.85809458 | c(5, 1) = 0.51432210 |
| c(6, 0) = 0.80355024 | c(6, 1) = 0.59595348 |
| c(7, 0) = 0.74126727 | c(7, 1) = 0.67184549 |

The number of coefficients can be increased or decreased dependent upon system requirements and desired accuracy for the magnitude approximation.

Referring again to FIG. 2, the comparator 46 compares the magnitude approximation to a predetermined threshold. If the magnitude approximation exceeds the predetermined threshold, the scaler 48 scales i and q by scaling factor equal to the threshold value divided by the magnitude approximation. Scaling i and q by such a factor yields a clipped magnitude approximately equal to the magnitude threshold. A digital filter 50 then band limits the clipped complex signal to suppress out of band frequency components.

Figure 5:
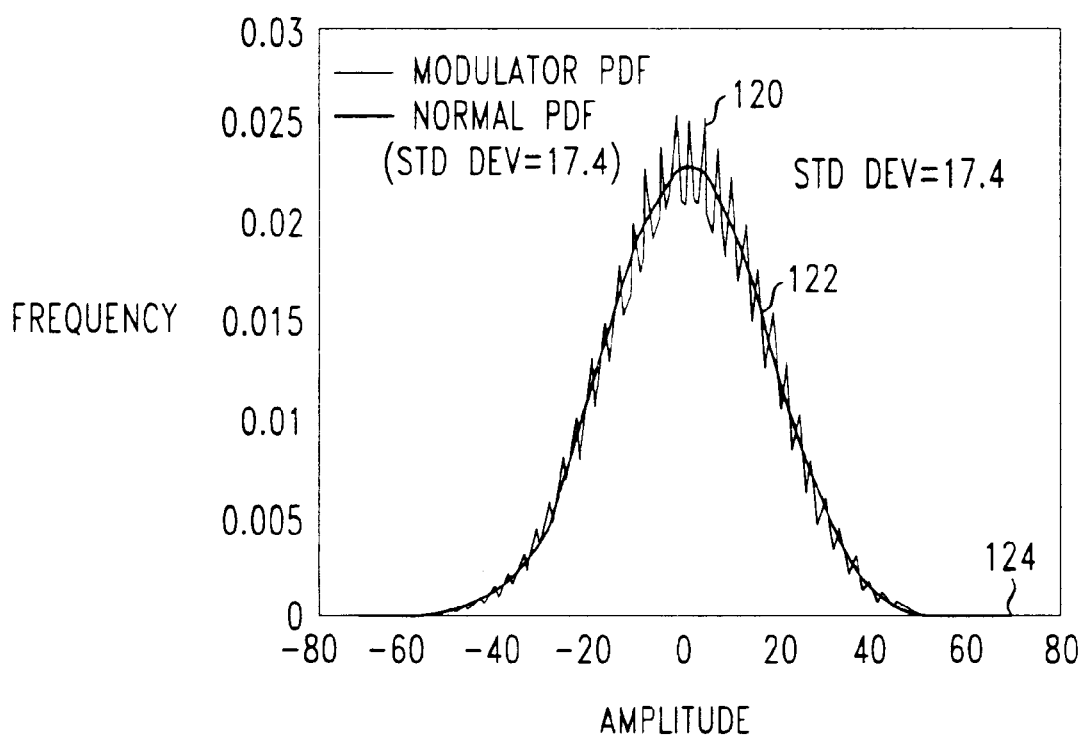
FIG. 5 shows exemplary probability density functions.

One of the advantages of the use of hard limiting in the digital domain prior to any frequency band filtering is that PAP ratio reduction can be performed in a deterministic manner. For example, FIG. 5 shows a Probability Density Plot 120 for the output of an example 128-channel CDMA modulator superimposed on the Probability Density Function of a normal distribution 122 with the same standard deviation as the modulator. With a sufficient number of users, the output of the spreading process approximates to a normal distribution. As can be seen, the standard deviation for the modulator and the normal distribution is 17.4.

The choice of clipping level is based upon the capability of the power amplifier. If a power amplifier supports a PAP ratio of 12 db with tolerable distortion, the clipping threshold is set to plus or minus 4 standard deviations from zero. As shown in FIG. 5, four standard deviations 124 correspond to an amplitude of approximately 70, and clipping will therefore occur infrequently. If more frequent clipping is tolerable, a power amplifier supporting a smaller PAP ratio may be chosen.

While the invention has been described with reference to a preferred embodiment, it will be understood by those skilled in the art having reference to the specification and drawings that various modifications may be made and various alternatives are possible therein without departing from the spirit and scope of the invention.

What is claimed is:

1. A method of reducing the peak to average power ratio of a complex signal produced by a code division multiple access modulator the signal having an in-phase component and a quadrature component, the method comprising:

applying hard limiting to the signal whilst it is in the form of a digital signal, including the steps of:
  determining the magnitude of the complex signal by:
    reducing the in-phase and quadrature components to a single octant of the complex plane;
    calculating a plurality of values, each value being a linear function of the reduced in-phase and quadrature components; and
    selecting the maximum of the values; comparing the magnitude with a threshold value; and
  scaling the in-phase and quadrature components by a scaling factor equal to the ratio of the threshold value to the magnitude if the magnitude exceeds the threshold value.

2. The method of claim 1, wherein the signal has not been subject to any frequency band filtering prior to the step of applying hard limiting to the signal whilst it is in the form of a digital signal.

3. A method of applying hard limiting to a complex signal whilst it is in the form of a digital signal, the method comprising:
   determining the magnitude of the complex signal by:
      reducing the in-phase and quadrature components to a single octant of the complex plane;
      calculating a plurality of values, each value being a linear function of the reduced in-phase and quadrature components; and
      selecting the maximum of the values.

4. The method of claim 3,
   comparing the magnitude with a threshold value; and
   scaling the in-phase and quadrature components by a scaling factor equal to the ratio of the threshold value to the magnitude if the magnitude exceeds the threshold value.

5. The method of claim 3, wherein the signal has not been subject to any frequency band filtering prior to the step of applying hard limiting to the signal whilst it is in the form of a digital signal.

6. Transmitter apparatus including a CDMA modulator arranged to combine a plurality of input signals by code division multiple access modulation, the CDMA modulator having an output for an in-phase component and an output for a quadrature component of a complex signal;
   an element having an input coupled to an output of the CDMA modulator, the element for applying hard limiting to the complex signal while it is in the form of a digital signal, the element having:
      a magnitude approximator having an input coupled to the output of the CDMA modulator, the magnitude approximator for determining the magnitude of the complex signal by reducing the in-phase and quadrature components to a single octant of the complex plane, calculating a plurality of values, each value being a linear function of the reduced in phase and quadrature components, and selecting the maximum of the values;
      a comparator having an input coupled to an output of the magnitude approximator and an output, the comparator for comparing the magnitude with a threshold value; and
      a scaler having a first input coupled to the output of the comparator, a second input coupled to the output of the magnitude approximator, and a third input coupled to the output of the CDMA modulator, the scaler for scaling the in-phase and quadrature components if the magnitude exceeds the threshold value.

7. The transmitter apparatus of claim 6, wherein the signal has not been subject to any frequency band filtering prior to the step of applying hard limiting to the signal whilst it is in the form of a digital signal.

8. The transmitter apparatus of claim 6, wherein the a magnitude approximator comprises:
   a first processing element having an input coupled to an output of the CDMA modulator, the first processing element for reducing the in-phase and quadrature components to a single octant of the complex plane;
   a second processing element with an input that receives an output of the first processing element, the second processing element for calculating a plurality of values, each value being a linear function of the reduced in phase and quadrature components; and
   a selector having an input receiving an output of the processor, the selector selecting the maximum of the values.

9. The transmitter apparatus of claim 6, wherein the scaler scales the in-phase and quadrature components by a scaling factor equal to the ratio of the threshold value to the magnitude.

10. Transmitter apparatus including a CDMA modulator arranged to combine a plurality of input signals by code division multiple access modulation, the CDMA modulator having an output for an in-phase component and an output for a quadrature component of a combined signal;
   an hard limiter having an input coupled to an output of the CDMA modulator, the hard limiter for applying hard limiting to the complex combined signal while it is in the form of a digital signal, the hard limiter having:
      a magnitude approximator having an input coupled to the output of the CDMA modulator, the magnitude approximator including:
         a first processing element having an input coupled to an output of the CDMA modulator, the first processing element for reducing the in-phase and quadrature components to a single octant of the complex plane;
         a second processing element with an input that receives an output of the first processing element, the second processing element for calculating a plurality of values, each value being a linear function of the reduced in phase and quadrature components; and
         a selector having an input receiving an output of the processor, the selector selecting the maximum of the values;
      a comparator having an input coupled to an output of the magnitude approximator and an output, the comparator for comparing the magnitude with a threshold value; and
      a scaler having a first input coupled to the output of the comparator, a second input coupled to the output of the magnitude approximator, and a third input coupled to the output of the CDMA modulator, the scaler for scaling the in-phase and quadrature components if the magnitude exceeds the threshold value.

11. The transmitter apparatus of claim 10, wherein the signal has not been subject to any frequency band filtering prior to the step of applying hard limiting to the signal whilst it is in the form of a digital signal.

12. The transmitter apparatus of claim 10, wherein the scaler scales the in-phase and quadrature components by a scaling factor equal to the ratio of the threshold value to the magnitude.

* * * * *